E. J. KANE.
DRIVING MECHANISM FOR MOTOR VEHICLES.
APPLICATION FILED DEC. 31, 1917.
1,306,065.
Patented June 10, 1919.
3 SHEETS—SHEET 1.
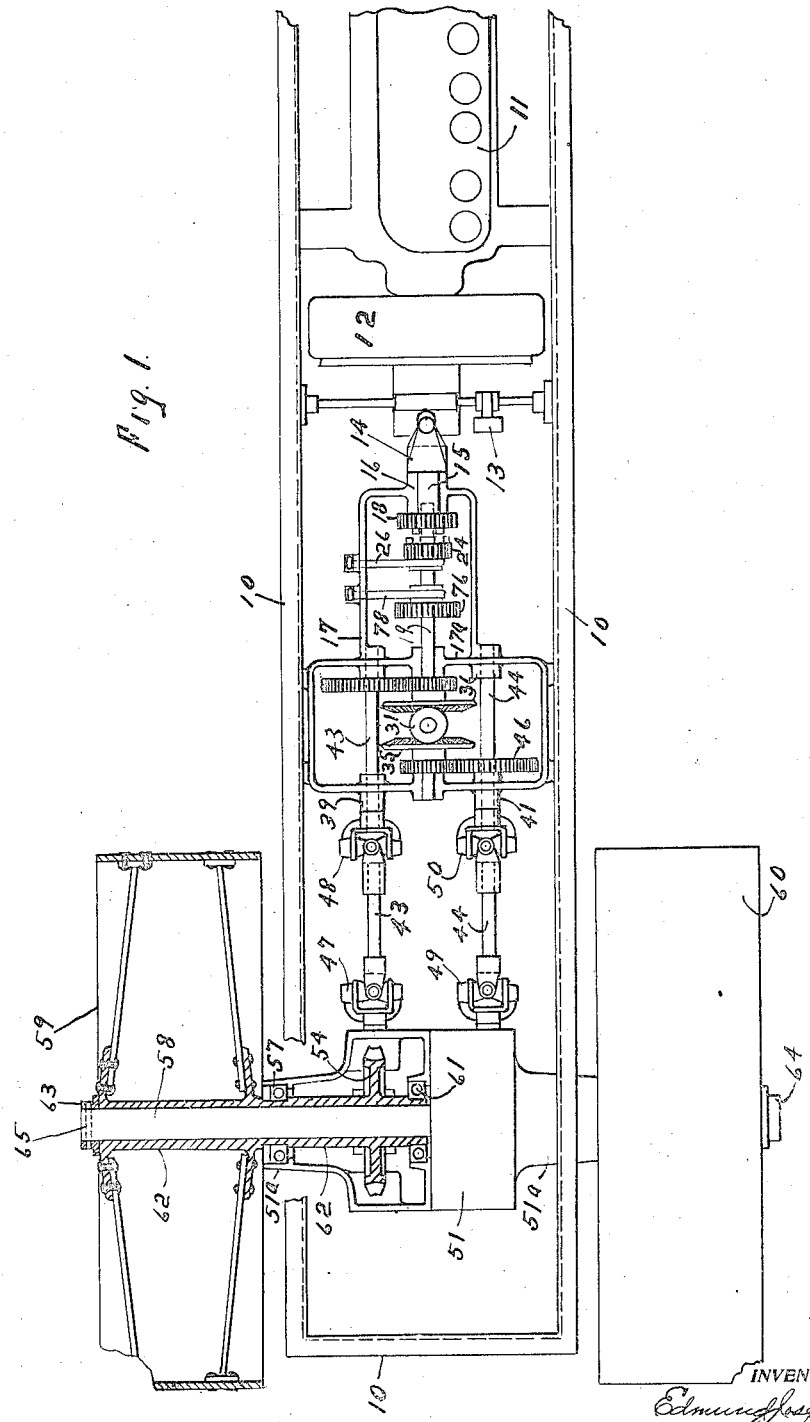
INVENTOR
Edmund Joseph Kane,
BY Arthur L. Sprinkle
ATTORNEY

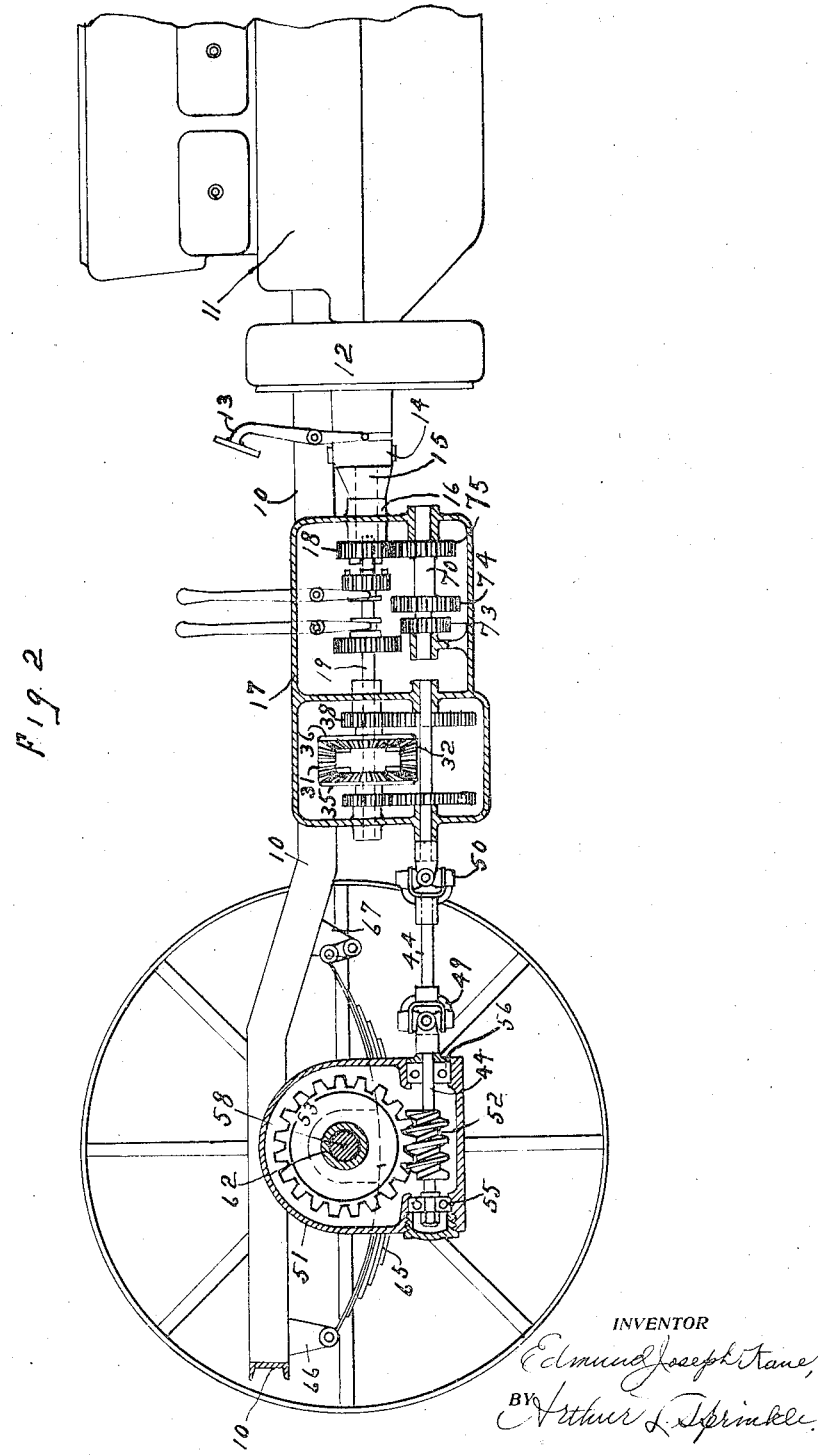

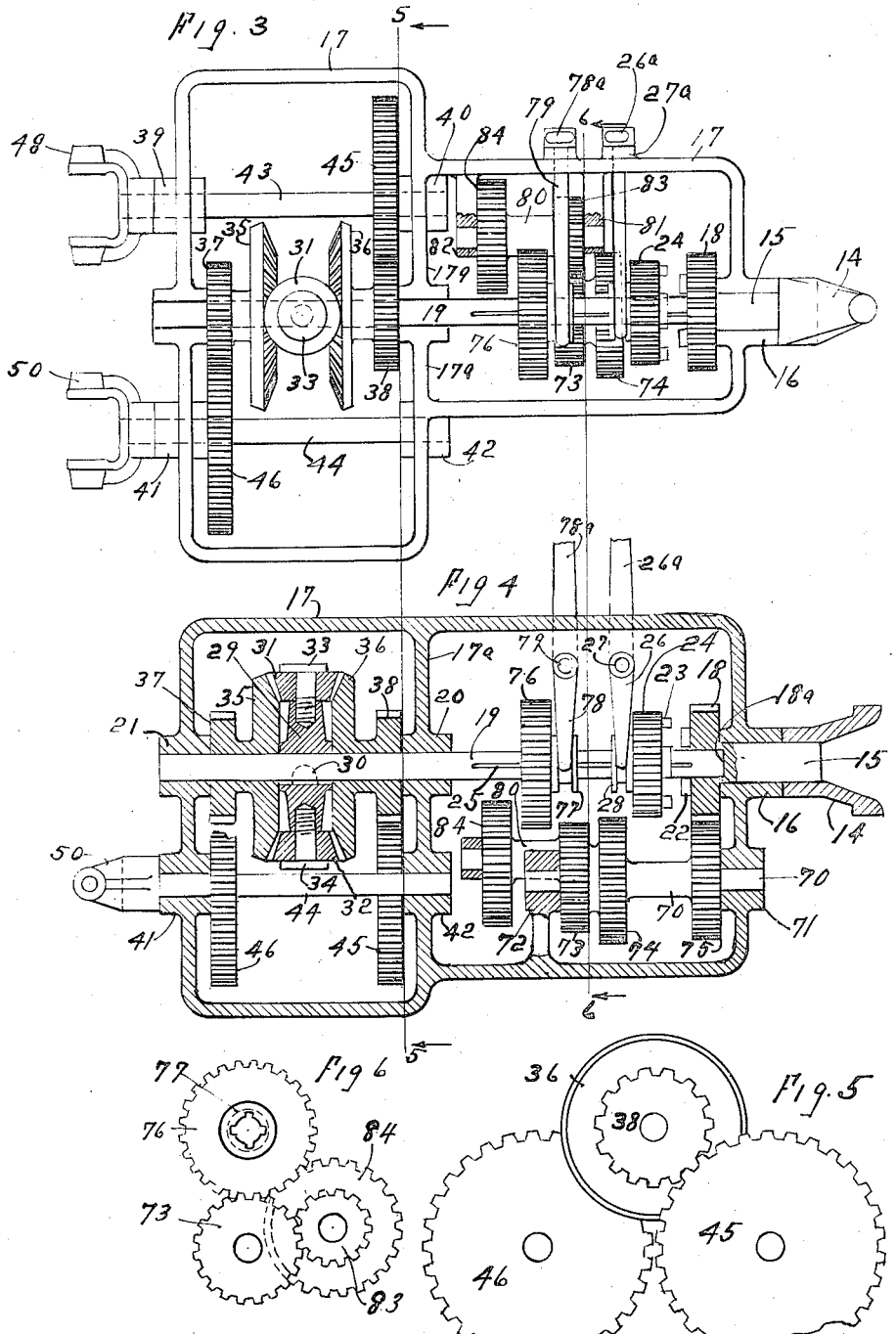

UNITED STATES PATENT OFFICE.

EDMUND JOSEPH KANE, OF CHICAGO, ILLINOIS.

DRIVING MECHANISM FOR MOTOR-VEHICLES.

1,306,065.            Specification of Letters Patent.      Patented June 10, 1919.

Application filed December 31, 1917. Serial No. 209,665.

*To all whom it may concern:*

Be it known that I, EDMUND JOSEPH KANE, a citizen of the United States, residing at Chicago, in the county of Cook and State of Illinois, have invented certain new and useful Improvements in Driving Mechanism for Motor-Vehicles, of which the following is a specification.

My invention relates to driving mechanism for driving motor vehicles and more particularly to mechanism for transmitting power from the motor to the carrying and driving wheels of the vehicle.

In the embodiment of the invention shown and described the device is of a form particularly adapted for use in gas or gasolene motor driven vehicles adapted for heavy service as for hauling or trucking purposes.

In the improved driving mechanism which I have devised as herein illustrated and described its application is made to a truck frame or to a tractor frame, both of which are vehicles designed for the heaviest service, the former for carrying or drawing loads of a heavy character on road ways and the latter adapted for pulling plows or other agricultural tools. The speed in an ordinary farm tractor as heretofore constructed making use of a four-cylinder motor is about 50-1 on plowing speed, that is the crank shaft of the motor makes 50 revolutions to 1 revolution of the driving wheels. In order to get this reduction from the motor to the driving wheels it is necessary to use a large number of gear reductions and many power transformations resulting in the loss of a large percentage of the power. It is an object of the invention to produce a power transmitting device which shall result in the desired speed reduction with a minimum loss of power due to wastage. It is well known that the higher the speed at which a power transmitting device is operated the lighter these power transmitting parts may be constructed, and it is an object of the present invention to arrange the chief speed reduction devices as near as possible to the driving wheels thus enabling the power transmission shafts and other power transmitting devices including the bearings therefor to be of relatively high speed and of the lightest possible construction consistent with the work required of them in delivering the necessary power to the driving wheels of the machine.

To accomplish this result I make use of an individual worm drive for each of the driving wheels. Double drive tractors or trucks have heretofore been driven with bevel gear drives on the rear axle for each of the driving wheels, but these are objectionable because of the general inefficiency of bevel gears which are expensive to make, and always result in the wastage of power to a greater extent than either spur gears or worm gears. I am aware that it has heretofore been proposed to use a single worm gear for driving the rear axle of a motor truck or tractor. This has been possible only on comparatively light machines, for reasons hereinafter set forth. It is easy with the worm drive to get a large reduction thus enabling the driving connections and the motor to rotate at relatively high speeds in relation to the driving wheels.

The worm drive also provides mechanism affording large reduction of speed which mechanism at the same time is easily protected from dirt and other foreign substances, whereas if the same speed reduction were sought to be obtained by bevel gear or spur gear mechanism the size of the gears on the axle would be very objectionable and hard to protect because of their excessive size, and furthermore on account of their excessive size they would not give sufficient road clearance. Heretofore in tractors and motor trucks when a single worm drive for transmitting the power to the driving axle has been employed it has been found possible to use such construction successfully only on small machines, because when it is sought to transmit the power necessary to drive a large and heavy machine through a single worm gear and drive shaft owing to the large ratio of speed reduction due to the employment of the worm gearing the pressure exerted by the worm has been found to be so great that it is difficult to make the worm and its bearings and coöperating parts so that the parts will not be cut out or wear out very quickly.

It is also true that the tendency in both tractors and motor trucks is toward larger and more highly powered machines. For example in about the years 1914 and 1915 the farmers accepted two plow tractors but after some experience and trials with them learned that two plows were not large enough to be efficient and economical and by the season of 1916 there was a general demand for a tractor that would pull from three to four plows. It has heretofore been common to use two driving chains from the driving mechanism and extending to each of the driving wheels on the rear axle. It is difficult however to protect these driving chains from dirt and to lubricate them and furthermore they do not afford the necessary speed reduction without increasing the size of the driven sprockets on the rear axle and interfering with the road clearance. Furthermore the use of the driving chains necessitates the placing of driven countershafts at right angles to the main longitudinal driving shaft extending rearwardly from the motor which always necessitates the use of objectionable bevel gears and an increase in the necessary number of power transformations with the resultant wastage of power.

In the place of my improved double worm drive on the rear axle it has heretofore been proposed to use the double bevel gear drive on the axle. The superiority of my improved double worm drive with spur gear transmission and differential carried on the main frame may be seen by comparing the structures in a tractor, the rear axle of which makes 20 R. P. M. With bevel gear on the rear axle it is possible to get about a 4–1 ratio and still have sufficient road clearance when the gears are properly protected. With a worm drive it is easy under such conditions to get a 20–1 ratio and where the worm drive is divided, and with spur gear transmission as provided in my invention, worm drive mechanism of sufficient strength to stand the pressure imposed upon it is possible without making the parts too large or unwieldy. On a bevel gear drive under such conditions as last mentioned the drive shaft would make 80 R. P. M., while under the same conditions a worm drive would make approximately 400 R. P. M. With a bevel gear drive therefore the universal joints and driving shafts and bearings would necessarily have to be constructed five times as large as on the worm drive mechanism in order to stand the strains and wear imposed upon them under the given conditions. In the present invention certain advantages are also obtained by placing the differential with its axis in line with the axis of the engine. In tractors and trucks of the present type the axis of the differential has heretofore generally been at right angles to the axis of the engine so that it has been necessary to transmit power to the differential by means of bevel gears. In my improved construction the advantage is obtained that on plowing or driving speed the power is transmitted direct to the differential and then by means of spur gears and divided shafts substantially parallel to the differential and the engine axis, to the worm drives on the rear axle. By this construction the use of any bevel gears is avoided in transforming the power from the motor to the worm drive. My improved construction also makes possible the use of a solid rear axle with its known advantages over the divided rear axle construction which latter requires an axle casing of sufficient strength to support the divided sections of the ordinary two-piece rear axle.

It is another object of my invention to provide improved power transmitting devices comprising a series of spur gears and differential mechanism on an axis parallel with the axis of the said spur gears all inclosed in a protective or lubricating casing carried on the main frame of the machine.

Other objects of the invention will appear from the following description of the preferred embodiment reference being had to the drawings which form a part of the specification.

In the said drawings Figure 1 is a plan view of a portion of the chassis of a motor truck or tractor embodying the invention with certain parts broken away and other parts in section to disclose details of the machine. Fig. 2 is a side elevation of the same construction shown in Fig. 1 with parts broken away and other parts in section. Fig. 3 is a top plan view showing the details of a portion of the power transmission casing with the gearing on the interior thereof and shafts connected therewith, certain parts being broken away and other parts in section to disclose details of construction. Fig. 4 is a substantially vertical longitudinal section on the line of the engine shaft of Fig. 3 with parts of the gearing broken away and parts in section to disclose details. Figs. 5 and 6 are detail views showing portions of the gearing arrangement on the interior of the transmission casing these views being taken on lines 5—5 and 6—6 respectively of Figs. 3 and 4. The reference character 10 designates generally the main frame of the machine, and the motor, which may be of any convenient design, is designated generally by the reference character 11 and is shown supported on the side bars of the main frame 10 (Figs. 1 and 2). Attached to the crank shaft of the motor is one part of the two-part clutch designated generally by the reference character 12, and adapted to be operated by the shipping lever 13, by which the motor crank shaft may be caused to engage or disengage with the main drive shaft extending rearwardly therefrom and comprising the universal joint connection 14, which has an extension 15 in bearing 16 at the front end of the transmission casing 17, which latter is supported on the main frame 10. The shaft 15 (Figs. 1 to 4 inclusive)

beyond the bearing 16 on the interior of the transmission casing 17 has secured to it the spur gear 18, which latter is provided with a counter-sunk hub portion 18$^a$ extending also if desirable into the interior of the shaft 15. A supplementary shaft 19 is mounted co-axially with the drive shaft 15 having one end journaled in the countersunk bearing 18$^a$. The supplementary shaft 19 is further supported in the bearings 20 and 21 of the transmission casing 17. The spur gear 18 is also provided with suitable clutch teeth as indicated at 22, which latter are adapted to be engaged by coöperating teeth 23 on sliding gear 24, which is splined or keyed at 25 to slide longitudinally on shaft 19 under the control of the gear shift lever 26 rigid with shaft 27 pivoted to some suitable support preferably on the gear case 17 as indicated at 27$^a$. The gear 24 is provided with a grooved hub portion 28 adapted to receive the usual forked end of the lever 26, by which it may be slid longitudinally on the shaft 19 to cause the clutch teeth 23 thereon to engage the coöperating clutch teeth on the gear 18 thereby causing the supplemental drive shaft 19 to rotate in unison with the main driving shaft 15 and the clutch 12 and motor crank shaft connected therewith.

Mounted on the supplementary shaft 19 within the rear compartment of the casing 17 between the bearings 20 and 21 is the differential mechanism including a pair of spur gears operated through said differential for the purpose of transmitting power of the supplementary driving shaft to the independently mounted driving wheels on each side of the motor vehicle. The bearing 20 for the supplementary driving shaft 19 is preferably integral with the casing 17 being supported on the integral division plate or web, designated by the reference character 17$^a$, which latter is preferably employed to divide the casing 17 into two closed lubricant containing compartments, the forward compartment of which is adapted to contain the speed control mechanism while the rear compartment contains the said differential mechanism, and the latter the divided power transmission mechanism extending to the driving wheels on each side of the vehicle. The differential mechanism which I have preferred to use is partly of a conventional form comprising the yoke member 29, having a hub portion fixed to rotate with the shaft 19 by a suitable key as indicated at 30, (Fig. 4). The yoke 29 carries the usual bevel pinions 31, 32 of which there are two spaced 180 degrees apart, and rotatably secured on the yoke by the studs 33 and 34. Loosely journaled on shaft 19 on each side of the yoke 29 are the coöperating bevel or face gears 35 and 36 which are preferably provided with elongated hubs affording ample bearing surface for these gears on the shaft 19, and affording convenient means for the securement to these gears of the spur gears 37 and 38, which latter are adapted to transmit the power from the differential for the driving wheels on each side of the machine.

In order to accommodate both the differential mechanism and the power transmission gears for the separated worm driving shafts the casing 17 at the rear of the division plate or web 17$^a$ is wider than the gear shift compartment (Figs. 1 and 3). The individual power transmitting shafts for driving the wheels at each side of the machine are journaled in suitable bearings as indicated at 39 and 40 at one side of the differential casing, and at 41 and 42 on the other side of this casing. The worm drive shaft 43 is journaled in the bearings 39 and 40, and the other worm drive shaft 44 is journaled on the opposite side of the casing in bearings 41 and 42. This arrangement permits of the use of spur gears 45 and 46 of a larger size than the gears 37 and 38, being mounted upon worm driving shafts 43 and 44 thus affording a limited amount of speed reduction. The divided worm drive shafts 43 and 44 extend rearwardly to the driving axle and are each provided with the usual universal joint connections adjacent the portions of the driving shafts held in fixed bearings in the transmission and differential casing, and in the worm drive casing supported on the axle at the rear, these joints being designated on the drive shaft 43 by the reference characters 47 and 48, and on the drive shaft 44 by the reference characters 49 and 50 respectively. The reference characters 43 and 44 have been applied to the divided worm driving shaft throughout regardless of the interposition of the universal joints 47 to 50 inclusive, to prevent multiplication of reference characters.

The divided drive shafts 43 and 44 are journaled in suitable bearings in the axle housing or casing 51 and each carry worms fixed to rotate therewith, as indicated by the worm 52 fixed to the shaft 44 (Fig. 2), these worms being adapted to engage and drive the worm gears 53 and 54 respectively, which are connected to rotate with the rear driving wheels of the machine (Figs. 1 and 2).

The worm drive casing 51 on the driving axle casing is of the general form of a cylinder being modified at the bottom as shown more clearly in Fig. 2, to afford means for securement in the casing of the bearings as designated by the reference characters 55 and 56 for supporting the worm drive shafts. The bearings 55 and 56 are preferably, although not necessarily of a ball bearing type or other recognized or established form of anti-friction bearing. Since the power of the divided shafts 43 and 44 is applied to the gears 53 and 54 through the worms 52 a high ratio of speed reduction is obtainable within the worm drive casing 51 without the necessity of making the worm gears 53 and 54 overlarge, and without the necessity of greatly enlarging the worm drive casing 51 on the axle, and insuring a liberal amount of road clearance. On either side of the worm gears 53 and 54 the bowl of the axle casing 51 is considerably reduced in size as indicated at 51ª, and in the outer extremity of these reduced portions suitable bearings, as indicated at 57 (Fig. 1) are provided for supporting the axle and power transmitting means carried thereby. The bearings 57 may be of any standard construction but are preferably of the ball bearing or roller bearing type as illustrated in the drawing. It is one of the important features of my invention that I am enabled to use a solid axle 58 for connecting the driving wheels 59 and 60. In the preferred construction I journal the hubs of the wheels 59 and 60 on the extremities of the solid driving axle 58, and I provide extensions of these hub portions around the axle 58 on the interior of the axle casing 51, causing these extensions to telescope over the axle 58 to approximately the middle thereof, being supported at their inner extremities by suitable bearings preferably of an anti-friction character as indicated at 61 (Fig. 1). These elongated hub portions of the wheels are designated generally by the reference character 62 (Figs. 1 and 2). To prevent longitudinal movement of the axle 58 the hub caps 63 and 64 are provided, and these may be locked to the extremities of the shaft 58 by the pins 65. Obviously the elongated hub 62 engages the bearings 57 at the outer extremities of the worm gear casing 51, and as seen by the sectional view in Fig. 1 the worm gears 53 and 54 are rigidly secured to rotate with the extended telescoping hubs of the wheels so that movement imparted to the worm gears 53 and 54 will act directly to rotate the driving wheels 59 and 60 on the solid axle 58. The operation of such portions of the invention as have been described is as follows:

The friction clutch 12 being disengaged as by the foot lever 13 the motor can be started and allowed to run freely without moving the vehicle. In starting the clutch is gradually applied and as the friction increases motion is transmitted by means of the clutch shaft through the knuckle joint 14 and the shaft 15 to the combined spur gear and clutch member 18, having the clutch teeth 22 thereon. If the position of the gear shift levers be neutral as shown for example in Figs. 3 and 4, the shaft 15 and the clutch gear 18 will rotate freely without imparting movement to the supplementary driving shaft 19, because of the loose connection of this shaft in the bearing of gear 18 on the end of the driving shaft.

Assume now that the gear shift lever 26 has been operated to cause the clutch teeth 23 of gear 24 to engage the teeth 22 on the driving shaft and it will be seen that as the gear 24 is slidably keyed to the supplementary driving shaft 19 the latter shaft will rotate in unison with the motor shaft, and the rotation of the spur gears 37 and 38 through the differential mechanism will rotate the spur gears 45 and 46 and the worm drive shafts 43 and 44 secured thereto, resulting in the rotation of the worms 52, and the worm gears 53 and 54 in engagement therewith, and resulting in the rotation of the driving wheels 59 and 60 in unison with the worm gears, because of the rigid connection between the worm gears and the driving wheels through the elongated hub portions of the latter, to which the worm gears are attached. In Fig. 2 is shown a semi-elliptic spring 65 secured at its extremities by brackets 66 and 67 to the machine frame. There is preferably one of such springs at each side of the machine frame for anchoring the rear axle to the main frame in the usual manner and permitting a certain amount of movement between the axle and the main frame, the universal joints 49 and 50 of the divided driving shafts 43 and 44 permitting of such relative movement between the rear axle and the frame without binding of the driving mechanism in its bearings.

This driving mechanism last described is for the purpose of propelling the tractor or motor vehicle at what may be termed the plowing speed or speed of maximum pulling efficiency. In Figs. 3 and 4 are shown low speed gearing, reverse gearing and also gearing for driving the machine at high or road speeds, i. e., gearing for driving the rear axle and driving wheels at a higher speed than what I have termed the plowing speed or speed of maximum pulling efficiency. This high speed gearing obviously adapts the machine for road uses and carrying purposes as in using the machine for trucking or hauling purposes where the load is not so great as in plowing or other agricultural usages and where the road way is likely to be of better and firmer construction than under conditions in which the machine is used in the fields or on soft ground.

I will next describe the gearing for attaining these different speeds.

70 is a supplementary shaft journaled in the bearing 71 in the outer wall of the transmission casing 17 adjacent the main driving shaft bearing 16, preferably just below the main drive shaft 15. The shaft 70 is supported at its other extremity by bearing 72 on the interior of the transmission casing.

Secured to rotate with the shaft 70 are the spur gears 73, 74 and 75, the latter being in constant engagement with the clutch spur gear 18 so that the shaft 70 and the gears 73 to 75 inclusive rotate constantly with the main driving shaft 15. 76 is a sliding gear that may be keyed or splined to rotate with the supplementary shaft 19 by the elongated key or spline 25 before referred to, and this gear also has a grooved hub 77 which is engaged by one end of the shifting lever 78, the latter being secured to rock shaft 79 journaled in the transmission casing 17 or some part fixed thereto and being provided with an accessible hand lever 78$^a$. There is also a countershaft 80 journaled to rotate in the spaced bearings 81 and 82 within the transmission casing, and this shaft has fixed to it spur gears 83 and 84.

In starting the machine, slow speed ahead is attained when the clutch is engaged and shaft 15 is rotating with the engine crank shaft and rotating with it, as it normally does gears 18 and 75 together with the other gears 73, 74 on shaft 70, by first having shifted the gear 76 controlled by hand lever 78$^a$ into engagement with gear 73, which will impart the rotation of the main shaft 15 and countershaft 70 to the supplementary shaft 19, and through the differential gearing carried thereby to the divided power shafts 43, 44 through the spur gears 37, 46 and 38, 45 respectively, while the rotation of the divided shafts 43, 44 and actuating the worm gearing connected therewith on the rear axle will rotate the driving wheels 59, 60 at a slow speed ahead, the reduction being secured in employing the relatively small gear 18 in mesh with the larger gear 75 and the relatively smaller gear 73 fixed to rotate with gear 75, and engaging the larger gear 76 on the supplementary shaft 19. After the machine is under way at slow speed ahead obviously the gear 76 may be disengaged from gear 73 by operating the shift lever 78$^a$ and the gear shift lever 26$^a$ may then be operated to cause the clutch gear 24 to engage the clutch gear 18 thereby propelling the machine in the forward direction at normal pulling or plowing speed with the supplementary driving shaft 19 rotating in unison with main drive shaft 15. Obviously the countershaft 80 is for the purpose of reversing the direction of rotation of the supplementary driving shaft 19, and the gear 83 is arranged to mesh normally with the gear 73 so that shaft 80 and the gear 84 carried thereby rotates constantly with the countershaft 70 and the main drive shaft 15. With the clutch out gear 76 may be shifted to engage gear 84, and when the clutch is then engaged power will be transmitted from the shaft 15 through gears 18 and 75 to countershaft 70, thence through gears 73 and 83 to countershaft 80, thence through gears 84 and 76 to supplementary driving shaft 19, thereby reversing the normal direction of rotation thereof and causing the main driving wheels to rotate so as to reverse the direction of travel of the machine. Road speed or high speed ahead is obtained by shifting when the clutch is out of engagement, the clutch gear 24 into engagement with gear 74, and the power will then be transmitted through gears 18 and 75 to countershaft 70, thence through the relatively large gear 74 fixed to the shaft 70 to the smaller gear 24 on supplementary driving shaft 19, multiplying the speed of this shaft and the resulting speed imparted to the driving wheels.

It will be seen that by the improved construction I have described only two power transformations are required between the motor and the driving wheels, when the machine is in normal operation, that is on plowing speed or speed of maximum pulling efficiency, and these power transformations are obtained by the spur gears adjacent the differential mechanism in the gear casing and the worm gears on the rear axle casing. Furthermore both these power transforming units are so constructed that they may run in oil bath insuring perfect lubrication, and the further advantage is secured by reason of the fact that in these power transformations no bevel gears are employed but only the spur gears and the worm gears which may be used to transmit the power with much less loss by friction than where bevel gears are necessitated.

Furthermore not only are the power transforming devices referred to all inclosed, but all bearings are inclosed from the motor to the rear driving axle and the solid rear axle is not only the strongest construction known but conserves power in securing rigidity of structure and freedom from binding of any of the operating shafts in bearings. Furthermore with my improved worm drive as described the differential being on the supplementary drive shaft in the gear casing, revolves at high speed, and because of its high speed made possible by this arrangement the differential can be made comparatively small and light, whereas when it is placed upon the rear axle, because of its slow speeds and the heavy strains to which it is subjected it would of necessity have to be large and expensive.

Furthermore with my simple double worm drive it will be seen that the pressures on the worms and the driving shafts will be small and that three to four plow tractors can therefore successfully be built which is not the case unless the power transmitting devices be of the most approved construction and unless they be made with such a degree of accuracy as to be almost prohibitive on account of the expense involved. Furthermore my improved construction keeps all the power transmitting mechanism down to and including the worms on the power transmitting shaft in the rear axle at relatively high speeds insuring light pressures until the rear axle is reached, with resulting economy of construction and long life in these vital wearing parts. Furthermore by the employment of my improved transmission device and speed reducing worm gears I am able to obtain the maximum amount of speed reduction between the engine and the rear axle, which is greatly desired in both tractors and trucks since the present tendency is toward lighter and higher speed motors, and the employment of lighter materials of a more expensive nature in this class of machines.

In order that the invention might be understood the details of the preferred embodiment have been shown and described but it will be apparent that persons skilled in the art may resort to various modifications without departing from the purpose and spirit of my invention.

I claim:

1. In a driving mechanism for motor vehicles the combination with a motor, of a transmission casing providing a lubricating bath for mechanism carried therein, a shaft driven from the motor, said shaft extending into said transmission casing, an extension of said shaft independently journaled in the casing, suitable intermediate mechanism in said casing for transmitting motion from said shaft to said extension thereof at the desired speeds and also for connecting and disconnecting the said shaft and said extension, a plurality of separated driving shafts operatively connected with the driving wheels of the vehicle, and a differential gear interposed between the said extension of the shaft driven from the motor and each of said driving shafts, said differential gear and the connections therebetween and the said separated driving shafts being located in the lubricating casing around the said motor driven shaft and said extension thereof.

2. In a driving mechanism for motor vehicles the combination with a motor, of a pair of separated driving wheels, a pair of separated driving shafts operatively connected with and having their axes angularly arranged to the axes of said driving wheels, a shaft driven from the motor, a differential gearing device operatively connected with said motor driven shaft, and a pair of spur gears connected with said differential, there being one of said spur gears in engagement with corresponding gears on each of the said driving shafts.

3. In a driving mechanism for motor vehicles the combination with a motor, of a shaft driven from the motor, there being suitable intermediate mechanism for transmitting motion from the motor to said shaft at selective speeds and also for connecting and disconnecting the said shaft from the motor, a plurality of separated driving shafts operatively connected with the driving wheels of the vehicle, and a differential gearing device interposed between the said shaft driven from the motor and each of said driving shafts, spur gears attached to the respective variable parts of the differential and mounted coaxially on said shaft, and coöperating gears secured to the separated driving shafts and engaging the said spur gears on the differential device.

4. In a driving mechanism for motor vehicles the combination with a motor, of a shaft driven from the motor, there being suitable intermediate mechanism for transmitting motion from the motor to said shaft at selective speeds, and also for connecting and disconnecting the said shaft from the motor, a plurality of separated driving shafts having their axes approximately parallel to the axis of the first said shaft and being operatively connected each with an independently rotatable driving wheel, a differential gearing device interposed between the said shaft driven from the motor and each of said separated driving shafts, spur gears attached to the respective variable parts of the differential and mounted coaxially on the first said shaft, and spur gears secured to the separated driving shafts and engaging the said spur gears on the differential gearing device.

5. In a driving mechanism for motor vehicles, the combination with a motor, of a shaft driven from the motor, there being suitable intermediate mechanism for transmitting motion from the motor to said shaft at selective speeds, and also for connecting and disconnecting the said shaft from the motor, a plurality of separated driving shafts having their axes approximately parallel to the axis of the first said shaft and being operatively connected each with an independently rotatable driving wheel, a differential gearing device interposed between the said shaft driven from the motor and each of said separated driving shafts, spur gears attached to the respective variable parts of the differential and mounted co-axially on the first said shaft, spur gears secured to the separated driving shafts and engaging the said spur gears on the differential gearing device, a pair of separated driving wheels, an axle therefor, a gear casing inclosing said axle, bearings in said casing for supporting said separated driving shafts with extensions of said shafts within the casing, screws or worms on said extensions within the casing, gears within the casing in engagement with said screws or worms, and means supported by the axle for connecting said gears and said driving wheels.

6. In a motor driven vehicle the combination with an elongated main frame, of a motor mounted on the front of the frame, a driving axle at the rear of the frame, power transmission devices between the said motor and rear driving axle comprising a shaft extending longitudinally of the main frame and coaxially with the crank shaft of the motor, means for causing the said shaft to engage and disengage the motor crank shaft, additional means for causing said shaft to be rotated at selective speeds in one direction, in a reverse direction, or to be disengaged in relation to said motor crank shaft, a gear casing supported by the main frame of the machine and inclosing the first said power shaft and the said selective power transmitting devices, a differential gear coaxially mounted in relation to the first said power shaft and means for transmitting the power of said shaft from said differential gear to separated driving wheels at each side of the said main frame.

7. In a motor vehicle the combination with a main frame, of driving wheels therefor, a motor mounted upon the frame, a shaft driven from the motor, suitable intermediate mechanism for transmitting motion from the motor to said shaft at selective speeds, at reverse speed, and also for connecting and disconnecting said shaft from the motor, a differential gearing mounted on an axis parallel with the said engine driven shaft, a pair of spur gears, one of each of said spur gears being connected to the variable portions of the differential gearing, a solid driving axle extending transversely of the main frame, a pair of driving wheels, one of each of said driving wheels being rotatably secured to the extremities of said solid driving shaft, the hubs of said driving wheels comprising elongated sleeves, an inclosed gear casing surrounding the said solid driving shaft and the said elongated hub portions of the driving wheels, bearings in the said casing for the said elongated portions of the driving wheels, gears adapted to be worm driven secured to the said elongated hub portions of the driving wheels on the interior of the casing, a pair of separated supplemental power transmission shafts extending from adjacent the differential gearing to the driving axle casing and extending through the walls of the casing to the interior thereof adjacent the said worm gears, worms on said supplemental driving shafts engaging the worm gears, and spur gears on the opposite extremities of said supplemental driving shafts engaging the said spur gears connected with the differential gearing.

8. In a motor driven vehicle the combination with a main frame, of a motor mounted thereon, an axle gear casing connected with the main frame, a pair of driving wheels having elongated hub portions or sleeves extending laterally from one side thereof to the interior of the said gear casing, bearings within said casing for rotatably supporting the elongated hub portions of the driving wheels, a worm gear secured to the elongated hub portions of each of the driving wheels on the interior of the casing, an inclosed gear casing mounted on the main frame between the motor and the driving axle, a driving shaft extending from the motor to the interior of the gear casing on the main frame, a clutch interposed between the driving shaft and the motor crank shaft, selective speed transmission gearing in the said casing, a supplemental driving shaft in the said casing operated from the main driving shaft by the said selective speed transmission gearing, the said supplemenal driving shaft being coaxially mounted in relation to the main driving shaft in suitable bearings in the gear casing, differential gearing mounted coaxially with the supplemental driving shaft within the gear casing on the main frame, a pair of separated power transmission shafts journaled at one end in suitable bearings in the gear casing on the main frame and each being provided with spur gears engaging spur gears connected with the differential gearing, worms secured to the extremities of the said power transmission shafts in the axle gear casing, in engagement with the worm gears on the said elongated hub portions of the driving wheels, and a solid axle shaft extending through the axle gear casing and through said elongated hub portions of the driving wheels.

9. In a motor vehicle the combination with power transmission devices, of a rear axle casing comprising an inclosed enlarged gear casing having on diametrically opposite sides thereof extended reduced portions, a pair of bearings on the interior of the casing, bearings near the outer extremities of the reduced portions of the casing, a solid axle extending through the casing, a pair of driving wheels each provided with elongated hub portions which latter are adapted to be sleeved over the solid axle and extending into the interior of the casing and supported by the said bearings, in the reduced portions thereof, means for locking the said driving wheel hub portions against longitudinal movement on the said driving shaft, worm gears secured to the elongated hub portions of the driving wheels on the interior of the axle gear casing between said bearings, and a pair of separately driven worms operated by the power transmission devices engaging the said worm gears within the axle casing.

10. In a motor vehicle the combination with power transmission devices, of a rear axle casing comprising an inclosed enlarged gear casing having on diametrically opposite sides thereof extended reduced portions, a pair of bearings on the interior of the casing, bearings near the outer extremities of the reduced portions of the casing, a solid axle extending through the casing, a pair of driving wheels each provided with elongated hub portions which latter are adapted to be sleeved over the solid axle and extending into the interior of the casing and supported by the said bearings in the reduced portions thereof, means for locking the said driving wheel hub portions against longitudinal movement on the said solid axle, worm gears secured to the elongated hub portions of the driving wheels within the enlarged portion of the gear casing, and a pair of separately driven worms operated by the power transmission devices and engaging the said worm gears within the axle casing.

11. In a motor vehicle, the combination with a motor and a pair of driving wheels of a pair of power transmitting shafts rotatably mounted on separated axes and being operatively connected with the driving wheels, and a differential gearing device interposed between the power transmitting shafts and being operably connected with the motor, the said differential gearing device being arranged on a substantially horizontal axis at right angles to the common axis of the said driving wheels.

12. In a motor vehicle the combination with a motor and a pair of driving wheels, of power transmitting devices interposed between the motor and the driving wheels comprising transmission gearing and a pair of separated driving shafts arranged at approximately right angles to the axis of the said driving wheels, and a differential gearing device interposed in the power transmitting devices between the motor and the said driving wheels, the said differential gearing device being arranged on a substantially horizontal axis at right angles to the common axis of the said driving wheels.

13. In a motor vehicle the combination with a motor and a pair of driving wheels, power transmitting devices interposed between the motor and the driving wheels and comprising a differential gearing device arranged on an axis at right angles to the common axis of the said driving wheels, a pair of power transmission shafts rotatably mounted on separated axes and connected with the variable portions of the differential gearing to be operated thereby, worm gears connected with each of the said driving wheels respectively and coöperating worms on each of the said shafts in engagement therewith.

14. In a driving mechanism for motor vehicles the combination with a motor, of a transmission casing providing a lubricating bath for mechanism carried therein, a shaft driven from the motor, said shaft extending into said transmission casing, an extension of said shaft independently journaled in the casing, suitable intermediate mechanism in said casing for transmitting motion from said shaft to said extension thereof at the desired speeds and also for connecting and disconnecting the said shaft and said extension, a plurality of separated driving shafts operatively connected with the driving wheels of the vehicle, and a differential gear interposed between the said extension of the shaft driven from the motor and each of said driving shafts, said differential gear and the connections therebetween and the said separated driving shafts being located in the lubricating casing around the said extension of the motor driven shaft.

15. In a driving mechanism for motor vehicles, the combination with a motor, a pair of separated driving wheels, a pair of separated driving shafts operatively connected with and having their axes angularly arranged to the axes of said driving wheels, a shaft driven from the motor, a differential gearing device operatively connected with said motor driven shaft, and a pair of spur gears connected with variable parts of said differential, there being one of said spur gears having operative connections with corresponding gears on each of the said driving shafts.

In testimony whereof I have signed my name to this specification on this 27th day of December, A. D. 1917.

EDMUND JOSEPH KANE.